Dec. 18, 1928.
H. S. PIERCE
COUPLING
Filed Oct. 12, 1926
1,695,343
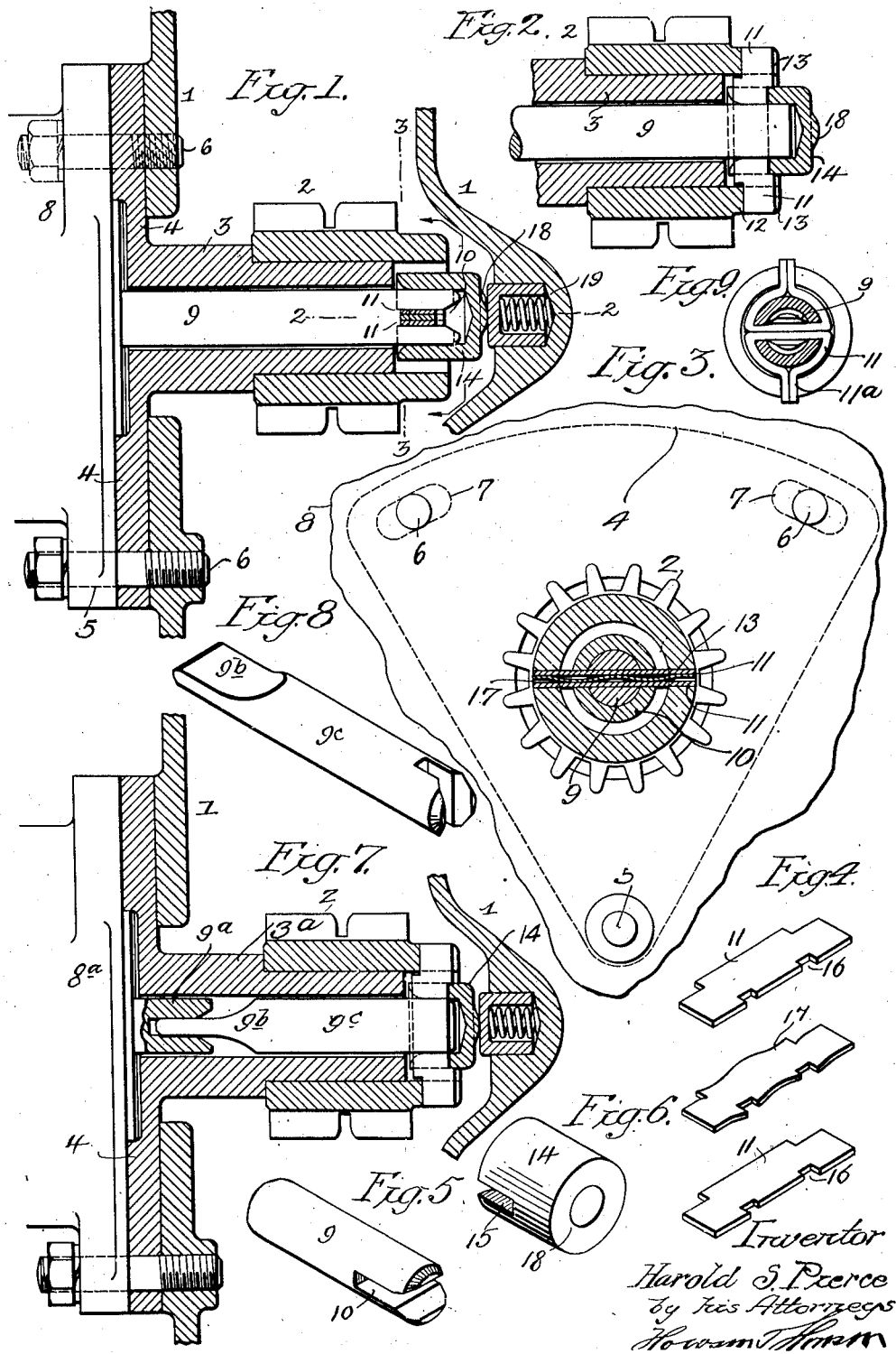

Patented Dec. 18, 1928.

1,695,343

UNITED STATES PATENT OFFICE.

HAROLD S. PIERCE, OF INDIANAPOLIS, INDIANA, ASSIGNOR TO LINK-BELT COMPANY, OF CHICAGO, ILLINOIS, A CORPORATION OF ILLINOIS.

COUPLING.

Application filed October 12, 1926. Serial No. 141,166.

My invention relates to certain improvements in couplings connecting a sprocket or other wheel to a shaft.

The invention is particularly adapted to the chain-drive for the auxiliary parts of an automobile engine.

One object of my invention is to provide a simple coupling which will allow a certain cushioning effect between the wheel and the shaft.

A further object is to so construct the coupling that a generator or other auxiliary part can be withdrawn without interfering with the coupling or the sprocket wheel and drive-chain.

In the accompanying drawings:

Fig. 1 is a sectional view showing a sprocket wheel and generator shaft connected by my improved coupling;

Fig. 2 is a sectional view on the line 2—2, Fig. 1;

Fig. 3 is a sectional view on the line 3—3, Fig. 1;

Fig. 4 is a detached perspective view of the coupling plates;

Fig. 5 is a perspective view of a portion of the shaft;

Fig. 6 is a perspective view of the cap;

Fig. 7 is a sectional view illustrating a modication of the invention;

Fig. 8 is a detached perspective view of the short shaft shown in Fig. 7; and

Fig. 9 is a view illustrating another modification of the coupling.

In the present instance 1 is the housing of the drive-chain of an automobile engine which passes around the sprocket wheel 2. This wheel is mounted on a tubular bearing 3, projecting from a plate 4 which is pivoted at 5 to the housing and is adjustably secured to the housing by bolts 6 which extend through slots 7 in the plate 4. A generator 8 in the present instance is mounted on the pivot 5 and is held in position by the bolts 6—6.

The generator 8 has a shaft 9 which extends through the hollow bearing 3 on the plate 4 as shown in Fig. 1. The end of the shaft 9 is slotted as at 10 to receive the coupling plates 11, shown in detail in Fig. 4. The hub of the sprocket wheel 2 has an extension 12 which is slotted at 13 to receive the coupling plates 11—11.

In order to hold the plates against longitudinal movement, said plates are notched at the corners to fit under the extension 12 of the hub of the sprocket wheel.

A cap 14 is slotted at 15, Fig. 6, and fits over the end of the shaft, the cap also acting as a thrust-bearing for the shaft. On the end of the cap is a projection 18 which bears against a spring abutment block 19 located in the present instance in a socket in the housing 1.

The plates 11 extend through the slots and they are preferably notched at 16 so that when the shaft 9 is withdrawn the cap is held in a central position by the plates.

Located between the two plates 11—11 is a spring-plate 17, preferably bent as shown in Fig. 4. This spring-plate forms a cushion and allows the coupling plates to yield to a certain extent when starting and stopping the mechanism.

In the construction shown in Fig. 1, the generator or other part can be detached and bodily removed from the bearing.

The shaft of the generator is withdrawn from the coupling plates 11—11, leaving the plates in position at the end of the sprocket wheel. When the generator is replaced, the shaft 9 is pushed into the hollow bearing 3 until the slotted end of the shaft engages the plates as shown in Fig. 1. The walls at the outer end of the slot 10 in the shaft 11 are beveled to allow the shaft to be coupled readily to the plates. The cap 14 is retained in position by the plates 11 when the shaft 9 is withdrawn.

Fig. 7 illustrates a modification in which the shaft $9^a$ of the generator extends only part way into the bearing $3^a$, and in the end of this shaft is a slot to receive the flattened portion $9^b$ of a shore connecting shaft $9^c$ which is connected at its outer end with the sprocket wheel by the plate coupling. The form of this shaft $9^c$ is clearly illustrated in Fig. 8.

In Fig. 7, the generator $8^a$ is removed with its short shaft $9^a$, leaving the shaft $9^c$ in position in the bearing. When the generator is placed in position again, the short shaft $9^a$ is coupled to the shaft $9^c$.

In Fig. 9 is shown a modification of the coupling. In place of the two flat plates 11—11 which extend through aligned slots in the sprocket wheel and shaft, the slots in the shaft are at right angles to those in the hub of the sprocket wheel, and plates $11^a$—$11^a$ are shaped so that each plate extends through the slot in the shaft and partly encircles the shaft, the two ends of each plate extending into a slot in the hub of the sprocket wheel.

I claim:—

1. The combination of a tubular bearing; a shaft rotatably mounted thereon and having a slotted end; a wheel mounted on the bearing and having a slotted extension projecting beyond the end of the bearing; two coupling plates extending into the slots; and a spring plate mounted between the two coupling plates.

2. The combination of a tubular bearing; a shaft located in and rotatable with respect to the bearing and having a slot at its outer end, the slotted end of the shaft projecting beyond the end of the bearing; a wheel mounted on the bearing and having a slotted portion also extending beyond the bearing; and a transverse plate extending into the slots of the shaft and wheel, and held against longitudinal movement by the wheel; and means for retaining the plate in the slots.

3. The combination of a tubular bearing; a shaft located in and rotatable with respect to the bearing and having a slot at its outer end, the slotted end of the shaft projecting beyond the end of the bearing; a wheel mounted on the bearing and having a slotted portion also extending beyond the bearing; a transverse plate extending into the slots of the shaft and wheel and held against longitudinal movement by the wheel; means for retaining the plate in the slots; and a slotted cap mounted on the end of the shaft for retaining the plate in position, the plate being notched to receive the cap, and an abutment for the end of the cap.

4. The combination of a tubular bearing; a shaft located in and rotatable with respect to the bearing and having a slotted end extending beyond the bearing; a sprocket wheel mounted on the bearing and having a slotted extension projecting beyond the bearing; two transverse coupling plates located in the slots; a plate spring located between the coupling plates to form a cushion; and a slotted cap arranged to retain the plates in position in the slots of the shaft and wheel.

HAROLD S. PIERCE.